United States Patent [19]

Röhling

[11] Patent Number: 4,699,173
[45] Date of Patent: Oct. 13, 1987

[54] MIXING AND PROPORTIONING DEVICE FOR FLOWING MEDIA

[75] Inventor: Holmer Röhling, Reinfeld, Fed. Rep. of Germany

[73] Assignee: Drägerwerk AG, Fed. Rep. of Germany

[21] Appl. No.: 862,704

[22] Filed: May 13, 1986

[30] Foreign Application Priority Data

May 14, 1985 [DE] Fed. Rep. of Germany ....... 3517325

[51] Int. Cl.⁴ ............................................. G05D 11/03
[52] U.S. Cl. ............................ 137/614.2; 128/203.25; 128/205.24; 137/625.41; 137/859
[58] Field of Search ........................ 128/203.12, 203.14, 128/203.25, 205.24; 137/98, 100, 606, 607, 614.2, 625.41, 859

[56] References Cited

U.S. PATENT DOCUMENTS

| 1,527,927 | 2/1925 | Schroder | 128/203.25 |
| 2,854,996 | 10/1958 | Hughes | 137/859 X |
| 3,429,326 | 2/1969 | Arnell | 137/98 |
| 3,739,799 | 6/1973 | Bickford | 137/100 X |
| 3,830,257 | 8/1974 | Metivier | 137/625.41 |
| 3,987,819 | 10/1976 | Scheuermann | 137/625.41 X |

FOREIGN PATENT DOCUMENTS 2224588 4/1977 Fed. Rep. of Germany .
2073373 10/1981 United Kingdom .......... 137/625.41

Primary Examiner—Robert G. Nilson
Attorney, Agent, or Firm—McGlew and Tuttle

[57] ABSTRACT

A mixing and proportioning device for flowing media, which has feeding lines equipped with a pressure reducer for each line that leads through a mixing chamber and a mixed gas discharge pipe is constructed so that the mixing device closes independently of the supply pressure in the feeding lines, as the pressure differential between the mixing chamber and gas discharge chamber drops below the initially set value. For this purpose, the mixed gas discharge channel is connected to a gas discharge chamber, which is separated from the mixing chamber by a pressure-sensitive spring-mounted device, and this device has a connecting channel equipped with a closing arrangement valve disposed between the mixing chamber and the gas discharge chamber.

9 Claims, 4 Drawing Figures 4,699,173

MIXING AND PROPORTIONING DEVICE FOR FLOWING MEDIA

FIELD AND BACKGROUND OF THE INVENTION

This invention relates in general to flowing media proportioning devices and in particular to a new and useful mixing and proportioning device particularly for use in controlling flowing media in respirators.

The invention concerns a mixing and proportioning device for flowing media, particularly produced from gaseous components, which has feeding lines, each with a pressure reducer, that lead into a mixing chamber of the device and flow out through a mixed gas discharge pipe. The device includes one wall of the mixing chamber which is formed by a pressure-sensitive spring-mounted device that is provided for the discontinuous closing off of the feeding lines from the mixed gas discharge pipe since a constant pressure regulator is also provided.

A mixing and proportioning device of a similar type has become known from the DE-S No. 22 24 588. In this device two gas components to be mixed are introduced into a mixing chamber through one feeding line, respectively. Each feeding line is equipped with a valve for its complete opening or closing. The valve heads are connected to a pressure-sensitive device that interrupts or releases discontinuously the gas supply to the mixing chamber in dependence on the excess pressure in the mixing chamber. The mixing chamber is connected to a mixed gas discharge pipe, through which the mixed gas is supplied to the user. When the pressure in the mixing chamber drops below a given value due to increased removal of mixed gas, the inlet valves are opened to allow gas with a higher pressure to enter the mixing chamber. When the removal of mixed gas from the mixed gas discharge pipe drops, thus causing a rise of the pressure in the mixing chamber, the pressure-sensitive device interrupts the gas supply into the mixing chamber by closing the inlet valves discontinuously. The switching pressure for the opening and closing of the inlet valves is determined by the excess pressure in the mixing chamber, in relation to the ambient pressure.

The pressure-sensitive device, which closes the feeding lines when the pressure in the mixing chamber drops below a given value, is provided since the adjusted mixing ratios cannot be maintained as the component pressure drops below a certain value, or as the removal rate of flow from the mixed gas line drops below a certain value.

But since the pressure value for the discontinuous opening and closing of the feeding lines is adjusted at a fixed setting with respect to the ambient pressure, the user will receive only the standard low mixed gas pressure, even when a higher operating pressure in the feeding lines is available. A utilization of higher available feeding pressures for the creation of higher mixed gas pressure is impossible.

SUMMARY OF THE INVENTION

The present invention provides an improvement of a mixing and proportioning device in such a manner that a mixing operation with values set once for the mixing ratio and for the necessary minimum removal rate of flow for the discontinuous closing and opening of the feeding lines is possible also under changed values for the operating pressures as well as for the mixed gas pressure This problem is solved by connecting the mixed gas discharge pipe to a gas discharge chamber that is separated from the mixing chamber by the pressure-sensitive spring-mounted device and which has a connecting channel or passage with a closure between mixing chamber and gas discharge chamber With the invention the mixing device can be closed independently of the supply pressure in the feeding lines, when the pressure differential between the mixing chamber and the gas discharge chamber drops below a set value. As soon as this pressure differential is exceeded, the connecting channel between mixing chamber and gas discharge chamber opens discontinuously, and the gas mixture flows from the mixing chamber into the gas discharge chamber. When the supply pressure in both gas inlet pipes rises uniformly while the connecting channel is open, the pressure in the gas discharge chamber rises correspondingly, so that the connecting channel remains open as long as only the pressure differential between mixing chamber and gas discharge chamber exceeds the set minimum value. A mixing and proportioning device for flowing media in which the pressure in the mixed gas discharge pipe is regulated by the pressure in the gas inlet lines, is obtained by this process.

The mixing and proportioning device according to the invention with its set values for the mixing ratio and for the switching pressure consequently can be connected to a gas supply installation with various operating pressures and can also supply the user with higher mixed gas pressures, when higher operating pressures are available.

Fluctuations in the supply pressures in the single component lines can be equalized by a pressure regulator, which has a control pressure regulator attached on the pre-pressure side to the first component line and on the after-pressure side with its diaphragm valve chamber via a control line to the control chambers of the pressure reducers, and with its control chamber to the second component line, and by connecting the chambers conducting control pressure to a ventilation opening.

This constant pressure regulation can be used in the event of a pressure change in one of the component lines, to control the pressure reducers in such a manner that constant pressures exist at the highest possible level in the feeding lines to the mixing and proportioning device according to the invention, a level which is determined by the lower of the two component pressures. When the connecting channel between mixing chamber and gas discharging chamber is closed, the constant pressure regulator also causes the pressure reducers of the two feeding lines to close. An uncontrolled subsequent feeding into the mixing chamber during a shut-down is removal, which would result in a different mixture there, is prevented. The same pressure conditions exist again, when the connecting channel is opened subsequently.

The ventilation opening is advantageously equipped with a discharge nozzle to prevent the discharge of unnecessary amounts of gas.

A pressure-regulated discharge valve connected to the ventilation opening allows a discharge only briefly during a drop in the pressure in the second component line below the pressure in the first component line, for the purpose of equalizing the pressure between membrane and control chamber of the control pressure regulator.

In connection with the constant pressure regulator according to the invention, a gas mixing and proportioning device is obtained, in which the after-pressure in the mixed gas discharge pipe is regulated by the pre-pressure in the component lines, and the mixing ratio depends solely on the settings of the proportioning unit.

The mixing and proportioning device according to the invention, together with the constant pressure regulator, operates independently of the removal amount at constant mixing ratios, as long as only the differential pressure between mixing chamber and gas discharge chamber exceeds a certain adjustable nominal value, as a measure of the removed amount.

In a further, practical example of the invention, the pressure sensitive device can have a disk spring for the discontinuous closing of the connecting channel and a control spring to adjust the necessary differential pressure between mixing chamber and gas discharge chamber.

In a preferred example, the pressure of the control spring can be altered by an adjustment device.

The closing device is shaped in an especially simple manner as a valve seat, which is located opposite the separating bridge in the mixing chamber and is removable.

A proportioning unit is preferably attached in front of the mixing chamber, and it can be used to adjust the mixing ratio by turning two valve disks movable in opposite directions.

In a further, advantageous practical example of the invention, the mixing chamber is equipped with an additional proportioning unit, which is connected parallel to the first proportioning unit. Both proportioning units are supplied by the same feeding lines. The additional proportioning unit is preferable adjusted to the exact metering of the gas components to be mixed in a lower flow range, for example from 1 to 10 L/min., and the first proportioning unit, to the exact metering in an upper flow range, for example from 10 to 100 L/min.

When the mixed gas is removed in the lower flow range, the metering is performed only by the additional unit. When the consumption rises to the upper flow range, the first proportioning unit is also switched on by the pressure-sensitive attachment.

As a result, a mixing and proportioning unit is obtained, which supplies exactly metered gas in a high dynamic range of 1:100, for example. The same dynamic range can either be subdivided in smaller steps or a higher dynamic range than 1:100, for example, can be reached by the parallel connection of additional proportioning units.

Accordingly it is an object of the invention to provide an improved mixer for use with a pressure regulator for component fluids which are supplied through separate feeding lines which comprises a housing having a mixing chamber therein with a connecting line from each of the feeding lines which extend into the mixing chamber and are provided with an adjustable flow control device which may be adjusted simultaneously for each of the connecting lines and which also includes a passage connecting the mixing chamber with a discharge chamber which is regulated by an adjustable spring control valve.

A further object of the invention is to provide a device for controlling the flow of fluids particularly in respirators which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

IN THE DRAWINGS

DESCRIPTION OF THE PREFERRED EMBODIMENT

Figure 2:
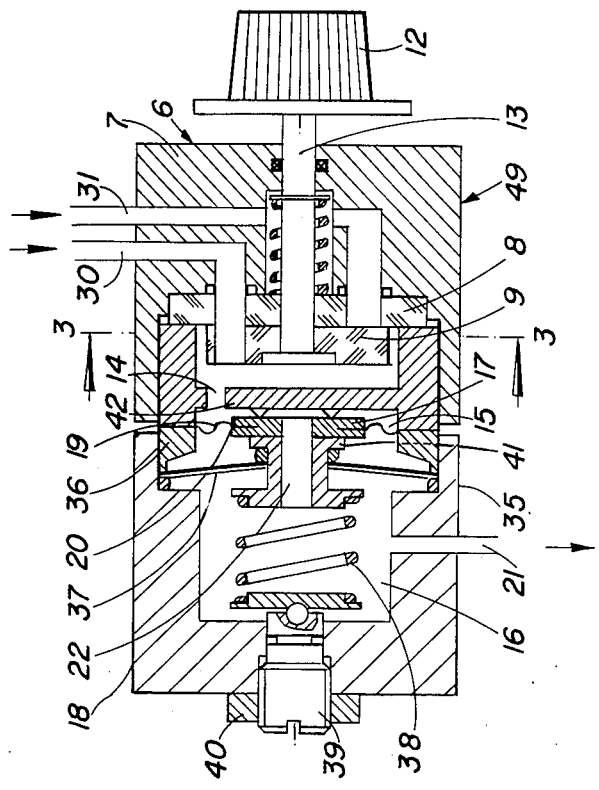
FIG. 2 is an enlarged sectional view of the mixer of FIG. 1.

Referring to the drawings in particular, the invention embodied therein comprises a mixing and proportioning device generally designated 49 for flowing components which are supplied through separate feeding lines 30 and 31. The device 49 includes a housing 7 (FIG.2) having at least one mixing chamber 15 therein. A connecting line 30 and 31 from each of the feeding lines extends into the mixing chamber 15. An adjustable flow control is associated with each of the connecting lines and it comprises rotatable discs 8 and 9 which may be adjusted by a single knob control 12 for simultaneously controlling the flow through the connecting lines 30 and 31 to the mixing chamber 15. The housing 6 contains a gas discharge chamber 16 having a mixed gas discharge 21 and it is arranged alongside the mixing chamber 15. A passage 22 connects the mixing chamber 15 to the gas discharge chamber 16 in a diaphragm valve 19 which is arranged between the mixing chamber 15 and the gas discharge chamber 16. Adjustable spring means, including a control spring 38 which is adjustable to rotating a bolt or screw 39 in its nut 40 controls the biasing of the control spring 38 which urges the valve 19 to a position closing the connection between the two chambers.

Figure 1:
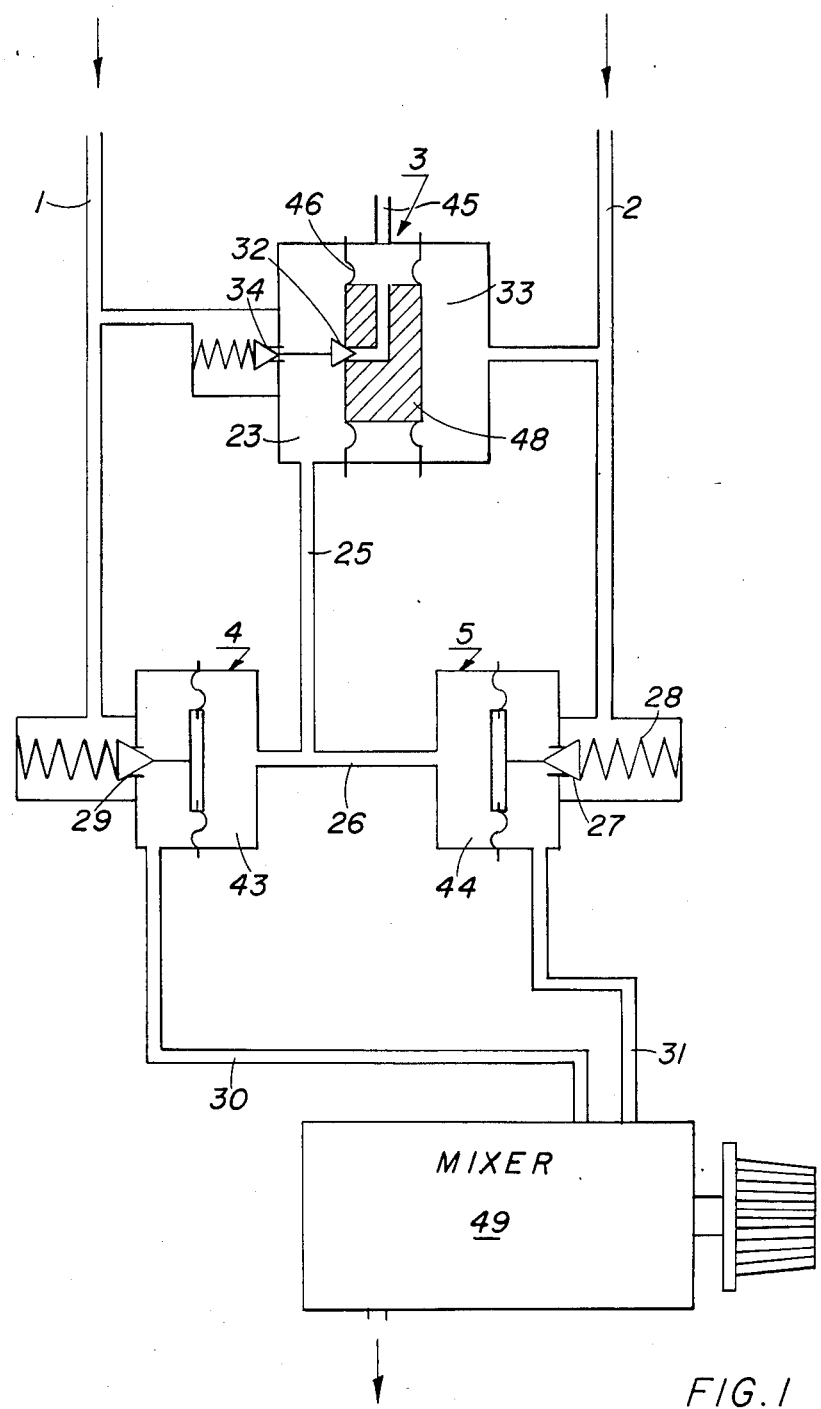
FIG. 1 is a schematic sectional representation of a mixer with a constant pressure regulator constructed in accordance with the invention.
Figure 3:
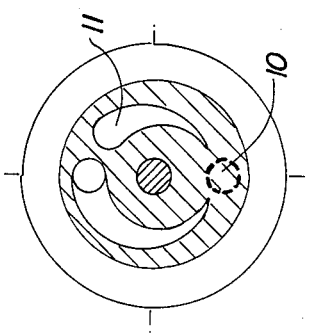
FIG. 3 is a sectional view through the line 3—3 of FIG. 2 showing the disc valve.

The gases to be mixed that are fed into the gas mixing equipment (FIG. 1) through component lines 1 and 2 are adjusted to the same pressure in pressure reducers 4 and 5, which are pneumatically controlled by control pressure regulator 3 and form a constant pressure regulator. The level of the pressure is determined automatically by the lower one of the respective pressures in component lines 1 and 2 through control pressure regulator 3. The mixing ratios are adjusted in mixer 49, where the mixing itself is performed.

The mixer 49 contains a proportioning unit 6, which comprises a disc valve 8. The disc valve 8, which has two openings 10, is rigidly mounted in housing 7. Two openings 11, which change in their cross sections in opposite directions, are located in a valve disc 9 mounted on a pivot adjacent the disc valve 8. By turning control button 12 for the mixing ratio a shaft 13 is rotated so that the openings 11 of disc 9 and openings 10 of disc 8 are more or less superimposed, depending on the desired mixing ratio. The mixed gases enter mixing chamber 15 through openings 14. Mixing chamber 15 is separated from gas discharge chamber 16 by a gastight membrane 19, which is mounted between housing 18 and a membrane or diaphragm frame 17.

When the differential pressure between mixing chamber 15 and gas discharge chamber 16 exceeds a certain value (e.g. 0.2 bar), the force exerted by membrane 17 exceeds the combined force of first or control spring 38 and second or disc spring 37, and membrane 17 lifts off closing device or valve seat 20 via a carrying piece 41 which is disconnected from a separating bridge 42. Through the action of the disc spring 37 attached to the carrying piece 41 at its periphery by adapters 36 in housing 35, the channel 22 stays open and the mixed gas flow moves through gas discharge chamber 16 into mixed gas discharge pipe 21. When the pressure increases on the gas discharge side (e.g. due to a low level of gas removal), the pressure differential between mixing chamber 15 and gas discharge chamber 16 drops again, and membrane frame 17 resumes its starting position, closing the valve seat 20.

Disc spring 37 holds carrying piece 41 fixed in its open position until the pressure differential drops, then lets piece 41 snap close. Disc spring 37 has two stable positons, one with the piece 41 closed and at which spring 37 also biases piece 41 closed, and one with piece 41 open and-at which spring 37 biases pieces 41 to remain open.

At pressure differentials between mixing chamber 15 and gas discharge chamber 16 above the minimum difference, connecting channel 22 always remains open, so that the mixing ratio is determined solely by pre-selecting the throttle cross section of valve discs 8 and 9.

The necessary pressure differential is adjusted by carrying the force acting on a control spring 38 by adjusting screw 39 and its nut 40.

The functioning of the constant pressure regulator in combination with the mixing and proportioning equipment is as follows:

When the pressure in component line 2 exceeds that in component line 1, this pressure will keep the valve 34 in the control chamber 33 of the control pressure regulator 3 constantly open. The gas pressure from line 1 then exists also through control lines 25 and 26 in control chambers 43 and 44 of the pressure reducers 4 and 5. The pressure in the component line 2 transmits itself to the valve 27 and moves this in a closing direction, under the closing effect of the spring 28, since a lower pressure from component line 1 exists in the control chamber 44. Valve 29 of the pressure reducer 4 is opened correspondingly wide, so that the pressures in feeding lines 30 and 31, which are equal, correspond to the lower of the two respective component pressures, in this case to the pressure in component line 1.

When the same pressure exists in component lines 1 and 2 the valve 34 closes. The control pressure is the gas pressure in line 1 and thus also in line 2.

The control pressure regulator 3 has a ventilation opening or vent 45, so that the control pressure in membrane chamber 23 can follow the dropping pressure in the control chamber 33, as the gas pressure in component line 2 drops further. Vent 45 is located in the space between a double membrane 46, which encloses a transition piece 48 that connects a pressure-controlled discharge valve 32 and vent 45 according to the flow. As the gas pressure drops further in the component line 2, the discharge valve 32 opens until the control pressure has dropped—due to relief through the discharge valve 32—to the new value corresponding to the pressure in component line 2. The afterpressures of pressure reducers 4 and 5 in the feeding lines 30 and 31 also correspond to this control pressure. As long as the connecting channel 22 is open, i.e., as long as a predeterminable pressure differential between mixing chamber 15 and gas discharge chamber 16 is reached, the pressure in feeding lines 30 and 31 will extend into the mixed gas discharge channel 21. Consequently, a mixed gas pressure is obtained which is subsequently adjusted to the starting pressures of the pressure reducers 4 and 5 by "floating".

With a closed connecting channel 22, i.e., when the required pressure differential between mixing chamber 15 and gas discharge chamber 16 can no longer be maintained because of dwindling removal of mixed gas, the pressure building up in the component lines 1 and 2 will effect a safe and defined closing of both of the valves 27 and 29. During subsequent opening of the connecting channel 22, e.g., with rising removal from mixed gas discharge pipe 22, the initially set pressure conditions will be restored in the feeding lines 30 and 31.

Figure 4:
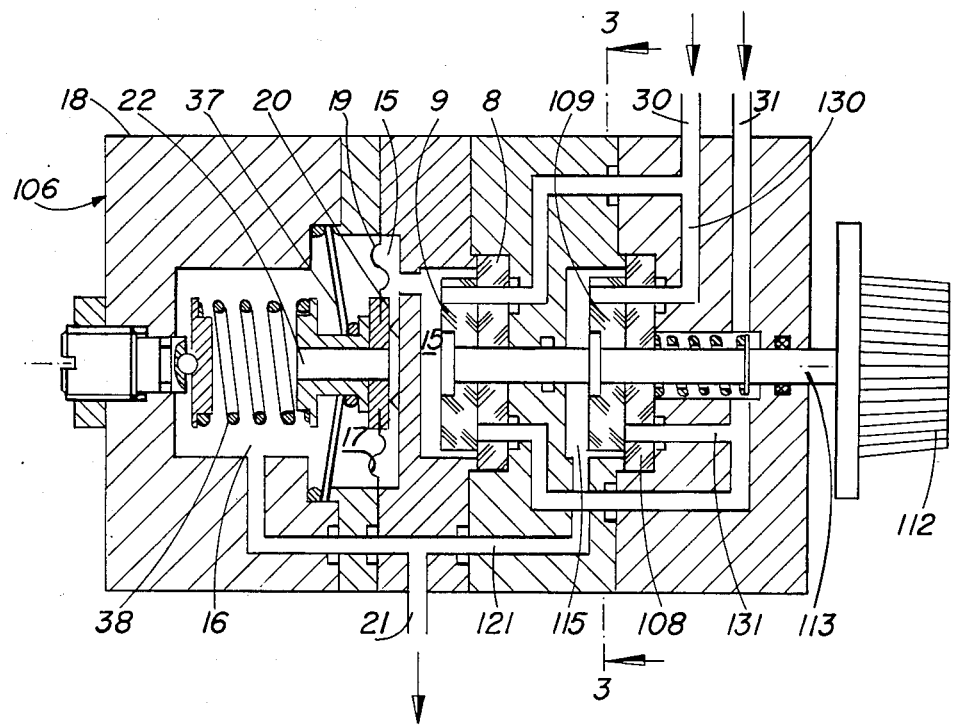
FIG. 4 is a view similar to FIG. 2 of a mixer with a double-proportioning unit.

A mixing and proportioning device 106 shown in FIG. 4 has an additional proportioning unit, which is connected parallel to the first proportioning unit having control discs 8 and 9. A channel 130 and 131, respectively, branches off into a mixing chamber 115 from feeding lines 30 and 31 extending into the first mixing chamber 15. From there, a mixed gas line 121 leads to mixed gas discharge 21 from gas discharge chamber 16. The proportioning of the gas components from branching channels 130 and 131 is carried out through two valve discs 108 and 109 turnable against each other, in the same manner as is the case with single-phase proportioning unit 6 and its valve discs 8 and 9. The turnable valve discs 9 and 109 of both proportioning units can be operated simultaneously with handle 112, 113.

When only a small amount of mixed gas is removed from mixed gas discharge channel 21, the connecting channel 22 remains closed because of the small pressure differential between the gas discharge chamber 16 and the mixing chamber 15, and the mixed gas is removed only from the gas discharge chamber 115, through a mixed gas line 121. When the removed amount of mixed gas increases to the point where it exceeds the delivery capacity of the proportioning unit 106, the pressure differential then produced between the gas discharge chamber 16 and the mixing chamber 15 will lift off the membrane frame 17 with its valve seat 20, against the force of the control spring 38 and the disc spring 37. The additional connection between the mixing chamber 15 and the gas discharge chamber 16 through the connecting channel 22 is now established. The gas is then removed through both of the mixing chambers 15 and 115.

The proportioning unit 106 can be calibrated optimally for the removal of small amounts of gas, and proportioning unit 6, for the removal of larger amounts of gas.

While a specific embodiment of the invention has been shown and described in detail to illustrate the application of the principles of the invention, it will be understood that the invention may be embodied otherwise without departing from such principles.

What is claimed is:

1. A mixing and proportioning device for flowing components supplied to separate feeding lines, comprising a housing having at least one mixing chamber therein, a connecting line from each of said feeding lines extending into said mixing chamber, an adjustable flow control associated with each of said connecting lines for simultaneously controlling the flow through said connecting lines to said mixing chamber, a gas discharge chamber in said housing adjacent said mixing chamber having a mixed gas discharge, a passage connecting said mixing chamber and said gas discharge chamber, a diaphragm valve between said passage and said mixing chamber, a first adjustable spring biasing said diaphragm valve toward a closed position closing said connecting passsage between said mixing chamber and said discharge chamber, and a second spring connected to said disphragm valve for biasing said diaphragm valve toward its closed position when said diaphragm valve is in its closed position and for biasing said diaphragm in valve toward an open position opening said passage, when said diaphragm valve is in its open position.

2. A device according to claim 1 wherein said diaphragm valve comprises a resilient member sensitive to pressure having a central valve piece for opening and closing said passage, said first adjustable spring including a coil spring bearing on said central piece, and means bearing against said spring with an adjustable force.

3. A mixing and proportioning device according to claim 2 wherein said means bearing against said coil spring comprises a screw member threaded into said housing having an end bearing against said coil spring and a nut engaged with said screw member for securing said member in an adjusted position.

4. A device according to claim 1 wherein said diaphragm valve includes a partition wall in said housing in said mixing chamber forming a valve seat and a diaphragm overlying said valve seat and carrying said connecting passage so as to position said connecting passage with its opening in said valve seat.

5. A device according to claim 1 wherein said adjustable flow control comprises first fixed valve disk provided with openings and a second valve disk with openings of variable cross section which is rotatable relative to the first disk so as to vary the size of the openings for the flow of the components.

6. A mixing device according to claim 5 including a single knob control connected to said valve disk for varying the position of said disks relative to each other.

7. A device according to claim 1 wherein said at least one mixing chamber comprises first and second space mixing chambers each having adjustable flow control, said feeding lines each including a first feeding line portion extending into the said first mixing chamber and a second feeding line portion extending into said second mixing chamber each being controlled by a separate adjustable flow control.

8. A device according to claim 1 wherein said second spring comprises a disc, spring, said diaphragm valve comprising a resilient member sensitive to pressure having a central valve piece for opening and closing said passage, said first adjustable spring comprising a coil spring engaged between said valve and said housing for biasing said valve piece toward the closed position of said diaphragm valve, said disc, spring being engaged between said valve piece and said housing.

9. A device according to claim 8 including a screw member threaded to said housing and engaged against said coil spring, said screw member being turnable to exert different pressures on said coil spring, and a nut threaded on to said screw member and threadable through said housing for holding the position of said screw member, said housing including a position wall in said mixing chamber forming a valve seat, said valve piece having said connecting passage defined therethrough, said connecting passage being closeable by engagement of said valve piece against said valve seat.

* * * * *